United States Patent [19]
Laitkep et al.

[11] 4,179,098
[45] Dec. 18, 1979

[54] SPACER PLATES FOR GATE VALVE SEAT ASSEMBLIES

[75] Inventors: Anthony A. Laitkep, Wharton; Danny S. Meyer, Richmond; Hamid J. Saka, Houston, all of Tex.

[73] Assignee: ACF Industries, Incorporated, New York, N.Y.

[21] Appl. No.: 946,907

[22] Filed: Sep. 28, 1978

[51] Int. Cl.² .............................................. F16K 25/00
[52] U.S. Cl. .................................... 251/167; 251/196; 251/328
[58] Field of Search ............... 251/167, 168, 196, 199, 251/328

[56] References Cited
U.S. PATENT DOCUMENTS

| | | | |
|---|---|---|---|
| 2,906,491 | 9/1959 | Young | 251/328 X |
| 3,036,813 | 5/1962 | Headrick | 251/199 X |
| 3,768,774 | 10/1973 | Baugh | 251/196 X |
| 3,823,911 | 7/1974 | Natho | 251/196 X |

Primary Examiner—Harold W. Weakley
Attorney, Agent, or Firm—Eugene N. Riddle

[57] ABSTRACT

A gate valve having a gate assembly of the expanding type employing a gate element (34) and segment (36) with adjacent wedge surfaces to expand the gate mechanism in both open and closed positons. Opposed floating seat skirts (68) having integral seat assemblies (52, 54) are positioned on opposite sides of the expanding gate valve and have facing slots (76) therein to receive spacer plates (82) therein which maintain a predetermined spacing between the skirts to minimize any binding of the skirts against the gate assembly and to provide a predetermined minimum clearance between the skirts at all times.

4 Claims, 5 Drawing Figures

SPACER PLATES FOR GATE VALVE SEAT ASSEMBLIES

BACKGROUND OF THE INVENTION

The field of art to which this invention pertains is a gate valve having a reciprocating gate assembly of the expanding type which expands outwardly at the open and closed positions of the gate assembly.

U.S. Pat. No. 3,823,911 dated July 16, 1974 is directed to a gate valve of the expanding type and has spacers between floating seat elements to maintain a predetermined minimum clearance between the seat elements and the gate assembly at all times. However, the spacer blocks extending between the seat assemblies are somewhat difficult to position as pin-type connections are required between the skirts and the spacer blocks in order to position and hold the spacer blocks in proper alignment. The assembly of such spacer blocks in a relatively limited space in the valve body is somewhat difficult.

SUMMARY OF THE INVENTION

The present invention is directed to an improvement in the gate valve structure shown in U.S. Pat. No. 3,823,911 in which the gate valve structure has a pair of seat skirts in opposed facing relation to each other which contain slots in which spacer plates are easily inserted. The spacer plates are inserted from the top of the valve body with the bonnet removed and dropped downwardly into the slots, and suitable set screws may then be inserted to hold the spacer plates in position. Seat assemblies are integrally connected to the skirts and move with the skirts. The seat assemblies may be removably connected to the skirts if desired, such as by suitable tapered cooperating lugs or by threaded connections. Preferably, the seat assemblies are integrally secured to the skirts by welding to provide stability for the skirts about the openings therein.

BRIEF DESCRIPTION OF THE DRAWINGS

In the accompanying drawings, in which one of various possible embodiments of the invention is illustrated:

FIG. 4 is a sectional view taken generally along the line 4–4 of FIG. 3 and showing the sealing face of a skirt in contact with the adjacent gate assembly;

FIG. 5 is an exploded view showing the spacer plates and a seat skirt having an integral seat assembly secured thereto.

Figure 1:
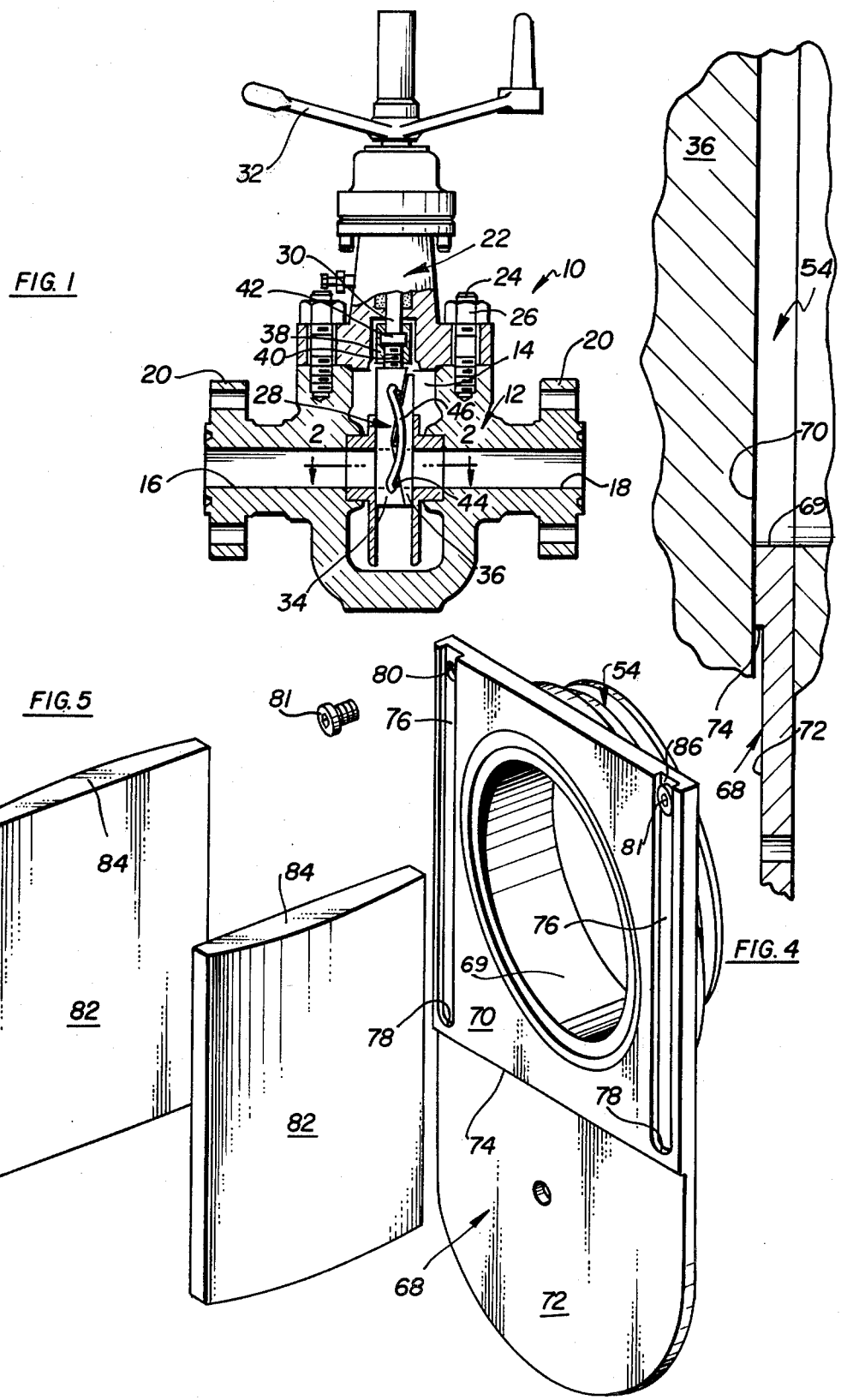
FIG. 1 is a sectional view, certain parts shown in elevation, of a gate valve structure embodying the present invention.
Figure 2:
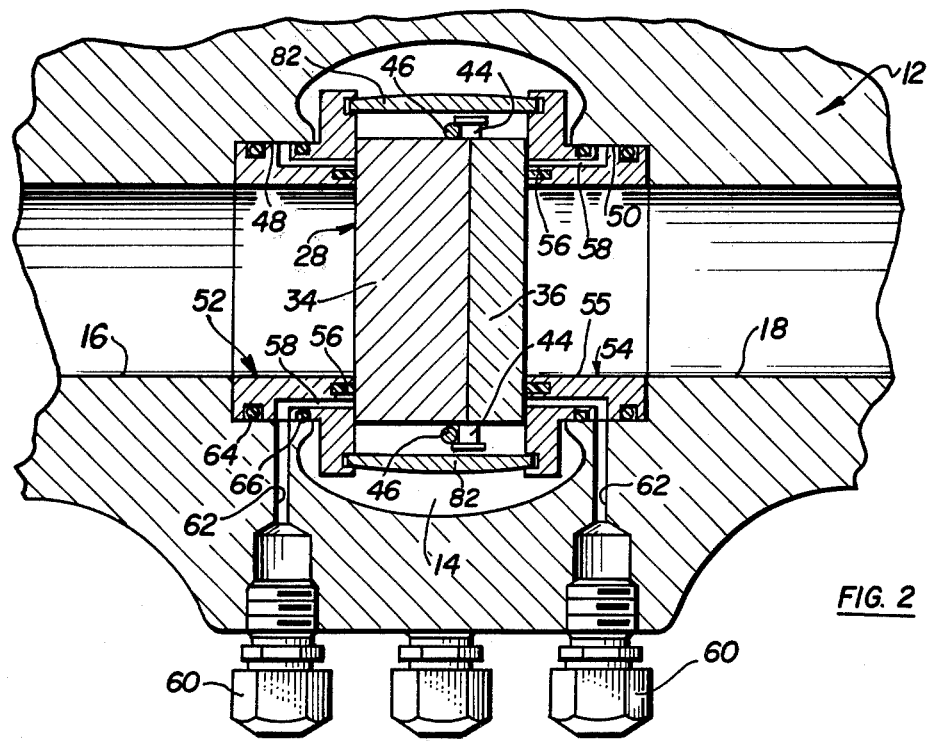
FIG. 2 is a longitudinal section looking generally along the line 2–2 of FIG. 1 and showing spacer plates forming the present invention positioned in slots of opposed seat skirts.
Figure 3:
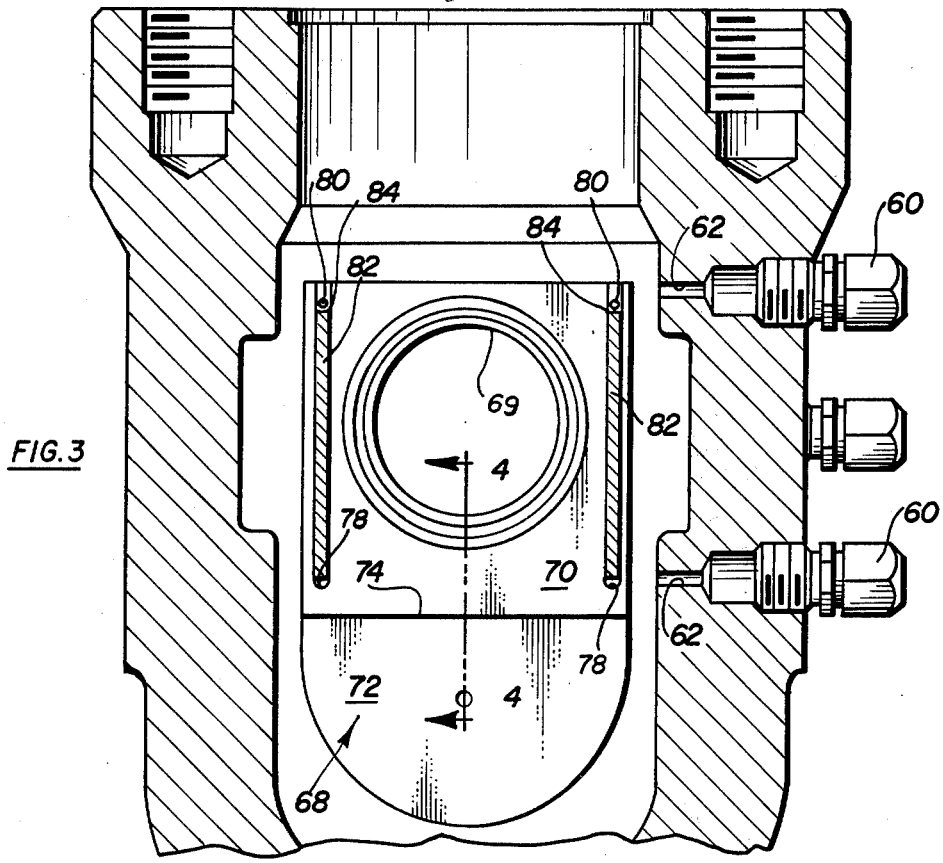
FIG. 3 is a transverse section of the spacer plates in position between the seat skirts and fitting within the slots in the seat skirts.

Referring now to the drawings for a better understanding of the invention, a gate valve structure generally indicated at 10 includes a valve body generally designated 12 having a valve chamber 14 therein. Inlet flow passage 16 and outlet flow passage 18 communicate with valve chamber 14. Flanges 20 on the ends of valve body 12 may be suitably connected to a connecting pipe line or other flow system as is well known in the art. A bonnet generally indicated at 22 is connected by studs 24 and nuts 26 to the upper end of body 12.

A gate valve assembly generally indicated at 28 is mounted in chamber 14 for movement between open and closed positions relative to flow passages 16 and 18. A valve stem 30 is connected to gate assembly 28 and handwheel 32 is operatively connected to valve stem 30 for moving gate assembly 28 between closed and open positions upon rotation of handwheel 32 as is well known in the art.

Gate assembly 28 includes a gate element 34 and a segment 36. Gate element 34 and segment 36 are of a complementary shape having interfitting V-shaped portions. An internally threaded nut 38 connects a threaded end 40 on gate element 34 to an enlarged end 42 of stem 30 for movement of gate assembly 28 with stem 30. Lugs or pins 44 extend from opposed sides of gate element 34 and segment 36 and spring 46 engage lugs 44 to continuously urge gate element 34 and segment 36 towards a collapsed or retracted position.

Formed by counter bores in valve body 12 adjacent valve chamber 14 are annular recesses 48 and 50. Substantially identical seat assemblies indicated generally at 52 and 54 are fitted within recesses 48 and 50 respectively. Suitable face seals 56 are provided to engage the adjacent seat assembly in sealing relation. Each seat assembly 52, 54 has a lubricant passage 58 which terminates adjacent face seal 56, and a suitable lubricant fitting indicated at 60 provides access to lubricant passage 62 in body 12 which is in fluid communication with lubricant opening 58. Annular grooves 64 and 66 extend about the outer circumference of each seat assembly 52, 54 on opposite sides of lubricant passage 58 and receive suitable O-rings therein for maintaining a sealing relation with the adjacent recess to minimize or prevent any leakage of lubricant therefrom.

Referring to FIG. 5, seat assembly 54 is shown therein in exploded view, it being understood that seat assembly 52 is substantially identical to seat assembly 54. Seat assembly 54 has an opening 69 therein and an integral seat skirt indicated at 68. While seat assembly 54 is shown as being a one-piece integral construction in FIG. 5, it is understood that skirt 68 may be secured to a separate seat skirt if desired, such as by welding. In addition, it may be desirable under some circumstances to have the seat assembly secured to the skirt by suitable locking-type lugs or by threaded arrangements. In any event, the seat assembly and skirt are secured together for simultaneous movement in the event of a floating of the seat assembly in its recess 50. As shown in FIG. 4, the sealing face 70 of skirt 68 adjacent the gate assembly has an undercut or indented surface portion 72 to form a step 74. Thus, upon reciprocating movement of gate assembly 28, there is no contact between skirt 68 and the adjacent gate assembly 28 except for the sealing face 70 extending around opening 69 in seat assembly 54. Formed in face 70 are a pair of longitudinal grooves or slots 76 extending on opposed sides of seat assembly 54, each groove 76 having a bottom 78. An opening 80 adjacent the upper end of groove 76 is adapted to receive a retaining screw 81 therein as will be explained.

A pair of spacer plates 82 extend between opposed seat skirts 58 and fit within grooves or slots 76. Spacer plates 82 maintain a predetermined minimum clearance between seat skirts 68 of integral seat assemblies 52 and 54 thereby to minimize binding of seat assemblies 52 and 54 against gate assembly 28. The upper ends 84 of spacer plates 82 are spaced below openings 80 and the upper ends of grooves 76. Thus, screws 81 may be inserted in openings 80 to limit the upward movement of spacer plates 82 after the spacer plates have been inserted.

For assembly, with bonnet 22 removed and seat assemblies 52 and 54 in position within valve chamber 14, spacer plates 82 are inserted from the upper end of the valve body within grooves 76 and rest on the bottoms 78 of grooves 76. Then, set screws 81 are turned inwardly to move within grooves 76 and thereby limit any upward movement of spacer plates 82. It is noted that the outer side surface of spacer plates 82 is of an arcuate curvature to provide rigidity to plates 82. Thus, a simple and efficient arrangement is provided to maintain a predetermined minimum clearance between seat assemblies 52, 54 at all times. In the closed position of gate assembly 28 a very high fluid pressure will tend to urge the upstream seat assembly into tight engagement with the adjacent gate assembly 28. However, spacer plates 82 limit the movement of upstream seat assembly 52 and thereby minimize the possible binding of the gate assembly 28 against seat assemblies 52 and 54. It is noted that the indentation or stepped portion 74 likewise minimizes the frictional contact area between gate assembly 28 and the adjacent faces of seat skirts 68 thereby to aid in minimizing the operating torque required for moving gate assembly 28 to an open position from a fully closed position. The initial "cracking" of the gate valve 28 from its fully closed position is the situation at which the highest operating torque normally occurs and the present invention aids in reducing the high operating torque required to initially "crack" the valve from its fully closed position, particularly under high fluid pressures.

In addition, spacer plates 82 limit the transverse movement or drifting of gate assembly 28. Thus, positive alignment of gate element 34 and segment 36 with flow passages 16 and 18 and the planar sealing faces 70 of seat assemblies 52 and 54 is provided.

What is claimed is:

1. A gate valve structure comprising a valve body having a valve chamber therein and inlet and outlet flow passages communicating with the valve chamber, an annular recess in the valve body surrounding each flow passage and opening into the valve chamber;
   an expanding gate valve assembly including a gate element and segment slidably mounted within the valve chamber for movement between open and closed positions with said gate element and segment expanding away from each other at the fully open and closed position, said gate element and segment having ports therethrough alignable with said flow passages in the open position of the valve assembly;
   a seat assembly fitting within each recess for floating back and forth movement each seat assembly having a flow passage and a skirt about the flow passage movable with the seat assembly, thereby forming a pair of skirts in opposed facing relation with the gate assembly positioned between the skirts, each skirt having a planar sealing face in facing relation to and in contact with the gate assembly, said skirts each having a pair of generally parallel grooves outwardly of the gate assembly extending in a direction generally parallel to the longitudinal axis of the gate assembly; and
   a pair of spacer plates alongside the gate assembly and between the skirts fitting in grooves in opposed skirts and extending in a direction generally parallel to the longitudinal axis of the flow passages and maintaining a minimum clearance between the seat assemblies and gate assembly.

2. A gate valve structure as set forth in claim 1 wherein said planar sealing face of each skirt is provided in an area about the flow passage in the skirt, each of said skirts having a lower portion in a spaced relation to the adjacent seat assembly to minimize frictional contact with the seat assembly.

3. A gate valve structure as set forth in claim 1 wherein the upper edges of the spacer plates are below the upper ends of said grooves, and means in said grooves above said upper edges retain the spacer plates within the grooves.

4. A gate valve structure as set forth in claim 1 wherein a bonnet is removably secured to the valve body, the upper ends of said grooves being exposed when the bonnet is removed to permit the spacer plates to be easily inserted within the grooves.

* * * * *